United States Patent
Lo

(12) United States Patent (10) Patent No.: US 7,015,891 B2
Lo (45) Date of Patent: Mar. 21, 2006

(54) BACKLIGHT SETTING METHOD OF ANALOG INSTRUMENT PANEL

(76) Inventor: Jui-Yang Lo, No.2, Alley 27, Lane 143, Yuanshan Rd., Junghe City, Taipei (TW)

( * ) Notice: Subject to any disclaimer, the term of this patent is extended or adjusted under 35 U.S.C. 154(b) by 296 days.

(21) Appl. No.: 10/419,831

(22) Filed: Apr. 22, 2003

(65) Prior Publication Data
US 2004/0212579 A1    Oct. 28, 2004

(51) Int. Cl.
*G09G 3/36* (2006.01)
(52) U.S. Cl. .................. 345/102; 345/5; 362/489
(58) Field of Classification Search ........... 345/102, 345/39, 76, 5, 75
See application file for complete search history.

(56) References Cited

U.S. PATENT DOCUMENTS 5,402,143 A * 3/1995 Ge et al. ................. 345/102

6,575,607 B1 * 6/2003 Klemish et al. ........... 362/489

* cited by examiner

*Primary Examiner*—Amr A. Awad
*Assistant Examiner*—Leonid Shapiro
(74) *Attorney, Agent, or Firm*—Rosenberg, Klein & Lee

(57) ABSTRACT

A backlight setting method of an analog instrument panel is provided. Through a cooperation between a microprocessor and an electronic control circuit, the backlight of the analog instrument panel can be cyclically varied. Moreover, the present invention employs the key set mounted outside the instrument panel to be pressed by the user for choosing a favorite backlight color during the backlight of the instrument panel is mixing changed. Furthermore, because the program design in the microprocessor, the illuminating element, through an asynchronous color mixing theory, can provide various colors to be set by the user for complying the backlight of the analog instrument panel with the like and demands of the user.

4 Claims, 3 Drawing Sheets

BACKLIGHT SETTING METHOD OF ANALOG INSTRUMENT PANEL

BACKGROUND OF THE INVENTION

1. Field of the Invention

The present invention relates to a backlight setting method of an analog instrument panel, and more particularly to a backlight setting method of an analog instrument panel which utilizes a program design in a microprocessor to control an illuminating element for outputting a mixing backlight and providing a setting choice of a user.

2. Description of the Prior Art

The conventional instrument panel (e.g., a tachometer), e.g., TW Patent No. 501727, has a main constitution characteristic that: a RGB illuminating element is driven by an electronic control circuit through a synchronous light mixing method, a user can utilize a switch element to cyclically switch backlights which comprise at least red, green, blue, yellow, indigo, purple and white lights, and when incorporating with a memorizing mode or a cyclical mode, the tachometer can projects changeable and various lights under using. However, the constitution described above exists a disadvantage that: the projection light utilizes the RGB illuminating element to mix the lights to be red, green, blue, yellow, indigo, purple and white color light sources so as to provide the user a cyclic color variation. As shown in FIG. 1, as the time goes, when the red light changes into the green light, the change exists no delay, and the color of the backlight adopts a fixed circulation mode. Thus, the user only can pick the color selected from the existed seven colors without other choices.

Thus it can be seen, the prior art described above still has some defects, is not a good design, however, and is urgently to be improved.

Because of the technical defects of described above, the applicant keeps on carving unflaggingly to develop the backlight setting method of an analog instrument panel through wholehearted experience and research.

SUMMARY OF THE INVENTION

An object of the present invention is to provide a backlight setting method of an analog instrument panel which employs a program design in a microprocessor for an illuminating element, through an asynchronous color mixing theory, to provide various colors when each main color light source thereof is changing, so that a user can easily choice his favorite color through pressing an external key set.

Another object of the present invention is to provide a backlight setting method of an analog instrument panel which can be utilized in every kind of instrument panel which needs a backlight and can provide all kinds of mixing colors to be chosen and set by the user corresponding to the character of the instrument panel.

The backlight setting method of the analog instrument panel for achieving the purposes described above includes: a microprocessor, a key set, an electronic control circuit and a RGB illuminating element. Through a cooperation between the microprocessor and the electronic control circuit, the backlight of the analog instrument panel can be cyclically varied. The present invention employs the key set mounted outside the instrument panel to be pressed by the user for choosing a favorite backlight color during the backlight of the instrument panel is mixing changed. Because the program design in the microprocessor, the illuminating element, through an asynchronous color mixing theory, can provide various colors to be set by the user for complying the backlight of the analog instrument panel with the like and demands of the user.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
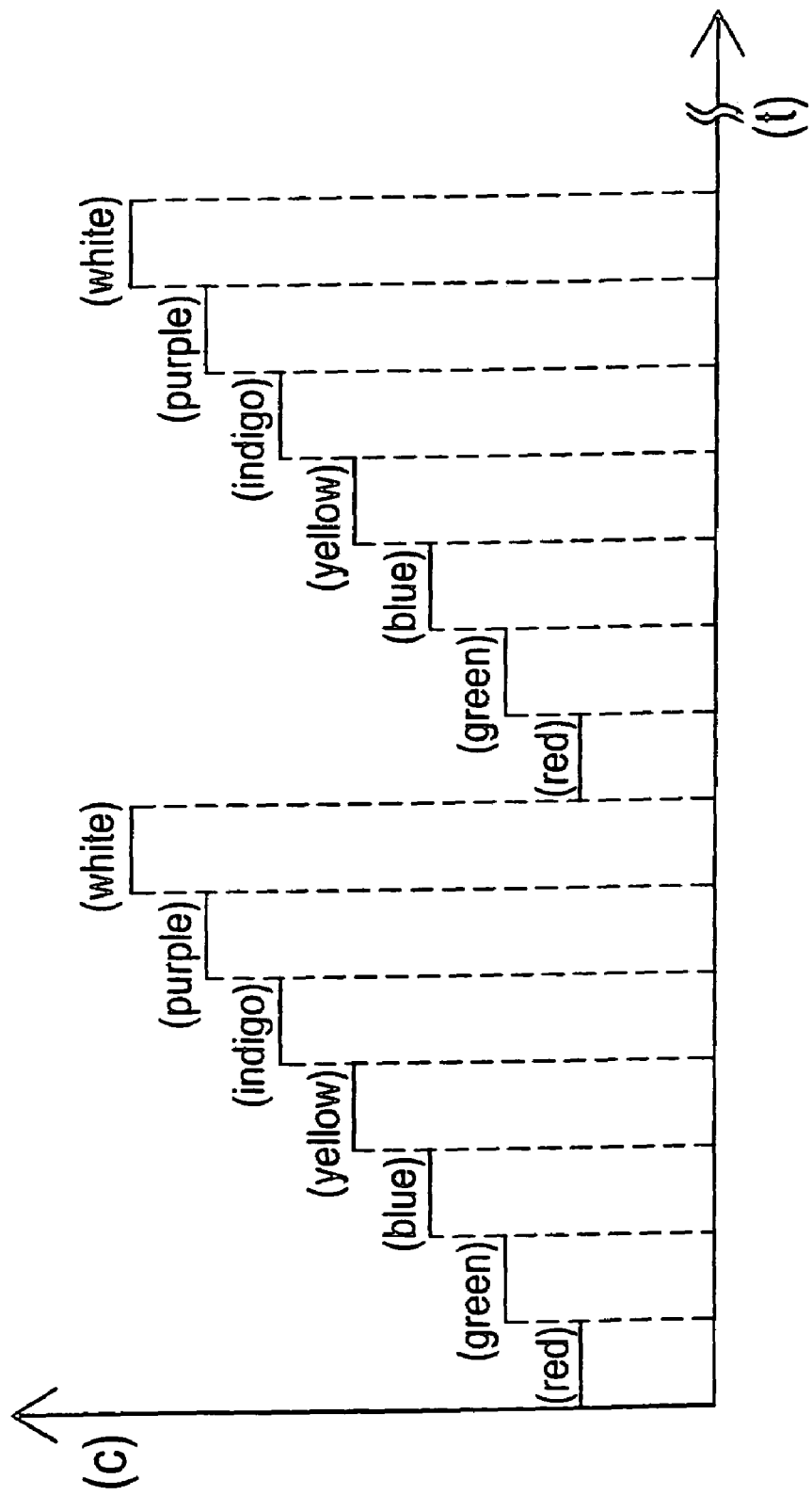
FIG. 1 shows a signal practicing schematic view of a backlight setting method of an analog instrument panel in the prior art.
Figure 2:
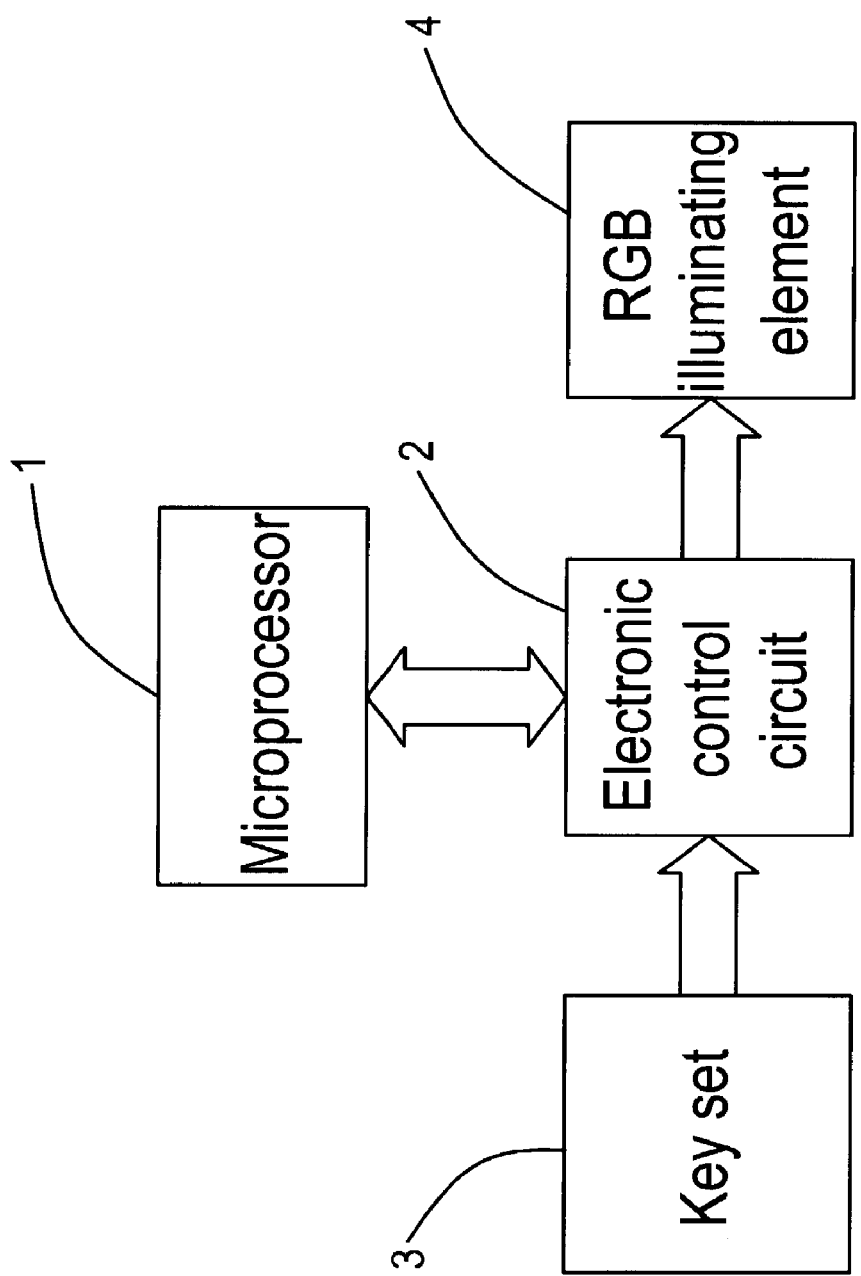
FIG. 2 shows a block diagram of the backlight setting method of the analog instrument panel according to the present invention.

Please refer to FIG. 2 which illustrates a block diagram of a backlight setting method of an analog instrument panel in a preferred embodiment according to the present invention. As shown in FIG. 2, for achieving the backlight setting method in the present invention, it includes:

a microprocessor 1 for controlling a variation of the backlight through a program burned therein and connected to an electronic control circuit 2 for receiving a setting signal inputted by a key set 3;

an electronic control circuit 2 connected to the microprocessor 1, the key set 3 and a RGB illuminating element 4 so as to receive a control signal inputted by the external key set 3, transmit the control signal to the microprocessor 1, and output a proceeded result to the RGB illuminating element 4;

a key set 3 connected to the electronic control circuit 2 and mounted on an external portion of the instrument panel for being used by the user when setting; and a RGB illuminating element 4 for receiving a signal from the microprocessor 1 and transforming the signal into a backlight output through the electronic control circuit 2;

wherein, through a cooperation between the microprocessor 1 and the electronic control circuit 2, the backlight of the analog instrument panel can be cyclically varied, the key set 3 mounted outside the instrument panel is employed to be pressed by the user for choosing a favorite backlight color during the backlight of the instrument panel is mixing changing, and because the program design in the microprocessor 1, the illuminating element 4, through an asynchronous color mixing theory, can provide various colors to be set by the user for complying the backlight of the analog instrument panel with the like and demands of the user.

Figure 3:
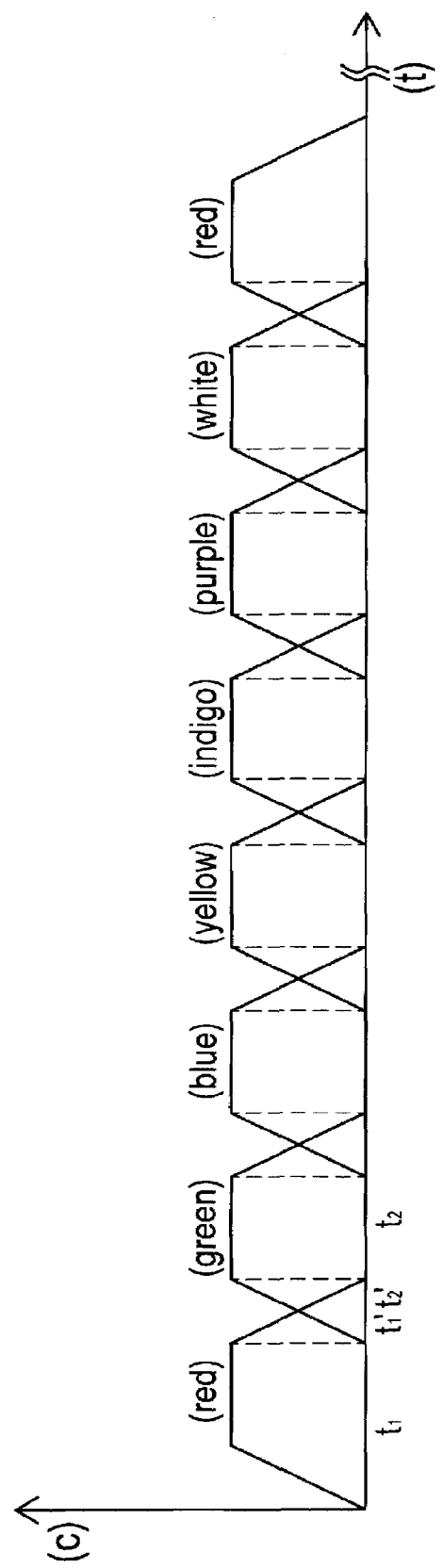
FIG. 3 shows a practicing oscillogram of the backlight setting method of the analog instrument panel according to the present invention.

Please refer to FIG. 3 which illustrates a practicing oscillogram of the backlight setting method of the analog instrument panel in a preferred embodiment according to the present invention. The microprocessor is designed base on the signal mode of the pulse wave shown in FIG. 3. When the red backlight signal (t1) is changed into the green backlight signal (t2), because the red backlight becomes weaker and weaker until the red backlight is burned out, a delay phenomenon of the red backlight is formed. At the same time, the green backlight becomes more and more brightening. Therefore, the weakening red backlight and the brightening green backlight (t1't2') will produce a multiple color mixing efficiency. Thus, when the backlight of the instrument panel is changing, a user can utilize an external key set to lock different backlight colors which are favorite; and so on, when the green backlight is changed into the blue backlight, the user still can lock the color freely.

The color, quantity and arrangement of the backlight described above will not influence the design of the present invention and only influence the achieved efficiency. Furthermore, because the microprocessor has a memorizing function, after the use sets the backlight color through the key set, the chosen backlight color will still be memorized therein only if the reset order is not commanded.

The backlight setting method of an analog instrument panel according to the present invention, when being compared with the other prior arts, further includes the advantages as follows:

1. The backlight setting method of the analog instrument panel according to the present invention employs a program in the microprocessor for the illuminating elements, through the asynchronous color mixing theory, to provide various colors when each main color source of the illuminating element is changing, so that the user can easily choice his favorite color through pressing the external key set.

2. The backlight setting method of the analog instrument panel according to the present invention can be utilized in every kind of instrument panel which needs a backlight and can provide all kinds of mixing colors to be chosen and set by the user corresponding to the character of the instrument panel.

3. The backlight setting method of the analog instrument panel according to the present invention can achieve the efficiency of multiple color backlights through the program design in the microprocessor. And, the manufacturing cost thereof can still be maintained low so that it can be fabricated in a great quantity.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A backlight setting method of an analog instrument panel, said backlight having a variation mode loaded in a program of a microprocessor, wherein illumination of a first backlight is transitioned into illumination of a second backlight, the illumination of said first backlight dims until faded out, thereby causing a delay phenomenon in said transitioning of said illumination of first backlight into illumination of said second backlight, and, illumination of said second backlight brightens, simultaneous to said dimming of illumination of said first backlight, said simultaneous dimming of illumination of said first backlight and said brightening of illumination of said second backlight produces a mixed, combined color effect, and when illumination of said backlight is transitioning, a user utilizes an external key set to lock different transitioning colors or to lock said mixed, combined color based on said user's preference; and so on, when illumination of said second backlight is transitioned into a illumination of a third backlight, said user is also capable of setting said color.

2. The backlight setting method of an analog instrument panel according to claim 1, wherein said method is achieved through:

a microprocessor for controlling a variation of said backlight through a program burned therein and connected to an electronic control circuit for receiving a setting signal inputted by a key set;

an electronic control circuit connected to said microprocessor, a key set and a RGB illuminating element so as to receive a control signal inputted by said key set, transmit said signal to said microprocessor, and outputting a proceeded result to said RGB illuminating element;

a key set connected to said electronic control circuit and mounted on an external portion of said instrument panel for being used by the user when setting;

a RGB illuminating element for receiving a signal from said microprocessor and transforming said signal into a backlight output through said electronic control circuit;

wherein said backlight of said analog instrument panel is cyclically varied through a cooperation between said microprocessor and said electronic control circuit, and said key set mounted outside said instrument panel is employed to be pressed by said user for choosing a favorite backlight color during said backlight of said instrument panel is mixing changed.

3. The backlight setting method of an analog instrument panel according to claim 1, wherein the color, quantity and arrangement said backlight does not influence a design of said microprocessor and only influence said achieved efficiency.

4. The backlight setting method of an analog instrument panel according to claim 1, wherein said color which is set by said user is memorized by said microprocessor which owns a memorizing function and is still shown on said instrument panel when starting next time only if a reset order is not commanded.

* * * * *